Aug. 28, 1928.  
D. J. COOK  
1,682,598
APPARATUS FOR TESTING EGGS
Filed Oct. 25, 1926
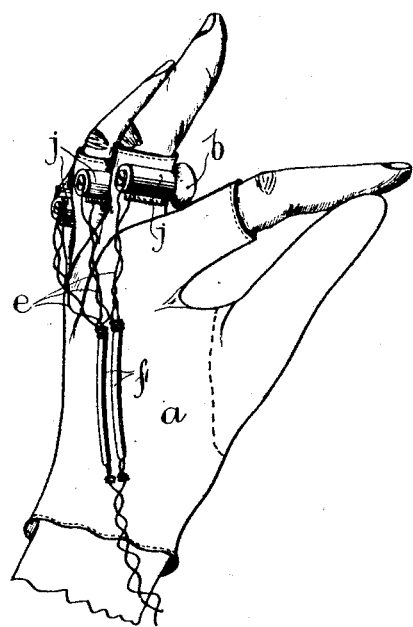
D. J. Cook, INVENTOR.
BY Toulmin & Toulmin, ATTORNEYS Patented Aug. 28, 1928.

1,682,598

UNITED STATES PATENT OFFICE.

DONALD JOHNSON COOK, OF GUNTHORPE, NEAR MELTON CONSTABLE, ENGLAND.

APPARATUS FOR TESTING EGGS.

Application filed October 25, 1926, Serial No. 143,988, and in Great Britain October 28, 1925.

This invention relates to apparatus for testing eggs.

It is the object of this invention to provide apparatus for manual use whereby eggs may be picked up by hand and their internal state ascertained with ease and facility.

An example of apparatus made in accordance with this invention is shown in the accompanying drawing.

A mitten $a$ is provided, adapted to fit on to the hand and be retained in position without interference to the use of the hand.

To the sides of the finger of this mitten are attached screw holders or sockets $j$, by stitches, rivets, or otherwise and lamp bulbs $b$ are screwed into the sockets in such manner that the tops or heads of the bulbs lie flush with the palm of the hand.

Flexible electrically conducting wires $e$ insulated by means of rubber tubes $f$ and $g$ lead to the bulbs $b$ from a battery, accumulator or the like and thus light the lamps.

In the drawing the bulbs are held to the sides of the fingers by holders $j$ stitched or otherwise attached to the glove.

In use the operator can pick up four eggs at once and see their state while counting them, thus saving a separate process of testing the eggs. As the light give good illumination wherever the operator puts his hands and as a testing room is always in semi-darkness this is an added advantage, it also allowing the state of the outside of the eggs to be seen.

What I claim and desire to secure by Letters Patent is:—

1. Apparatus for testing eggs comprising a glove for fitting on the hand on which are mounted electric lamp bulbs between the fingers set towards the palm, said lamps being fed by means of flexible connecting wires passing up the back of the glove.

2. Apparatus for testing eggs comprising a mitten for the hand to which are attached between the fingers electric lamps set towards and lying substantially flush with the palm of the hand.

In testimony whereof, I affix my signature.

DONALD JOHNSON COOK.